G. G. BARKER.
PORTABLE MINING MACHINE.
APPLICATION FILED JULY 21, 1909.
966,378.
Patented Aug. 2, 1910.
4 SHEETS—SHEET 4.
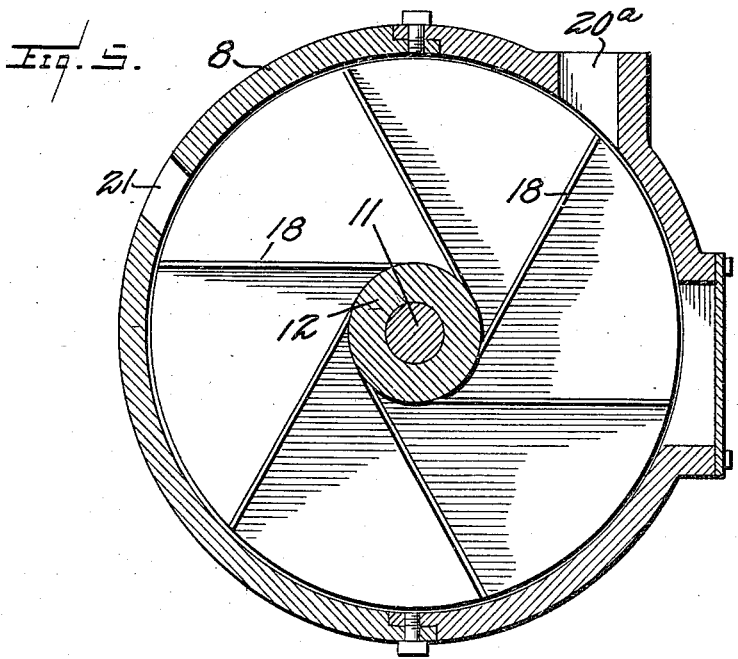
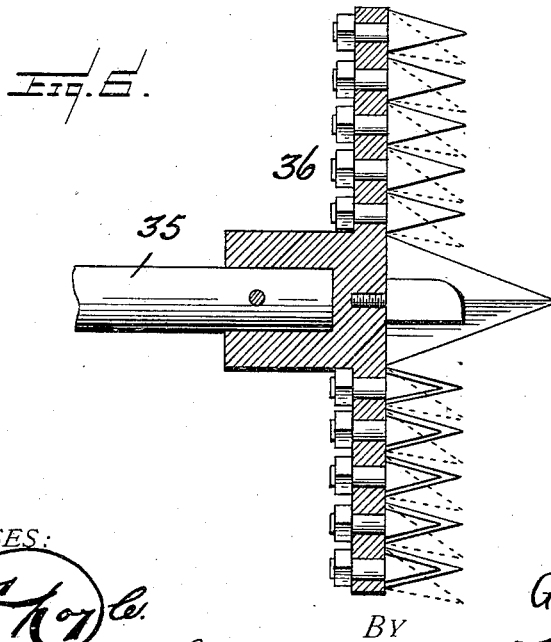
WITNESSES:
INVENTOR
George G. Barker
BY
his Attorney.

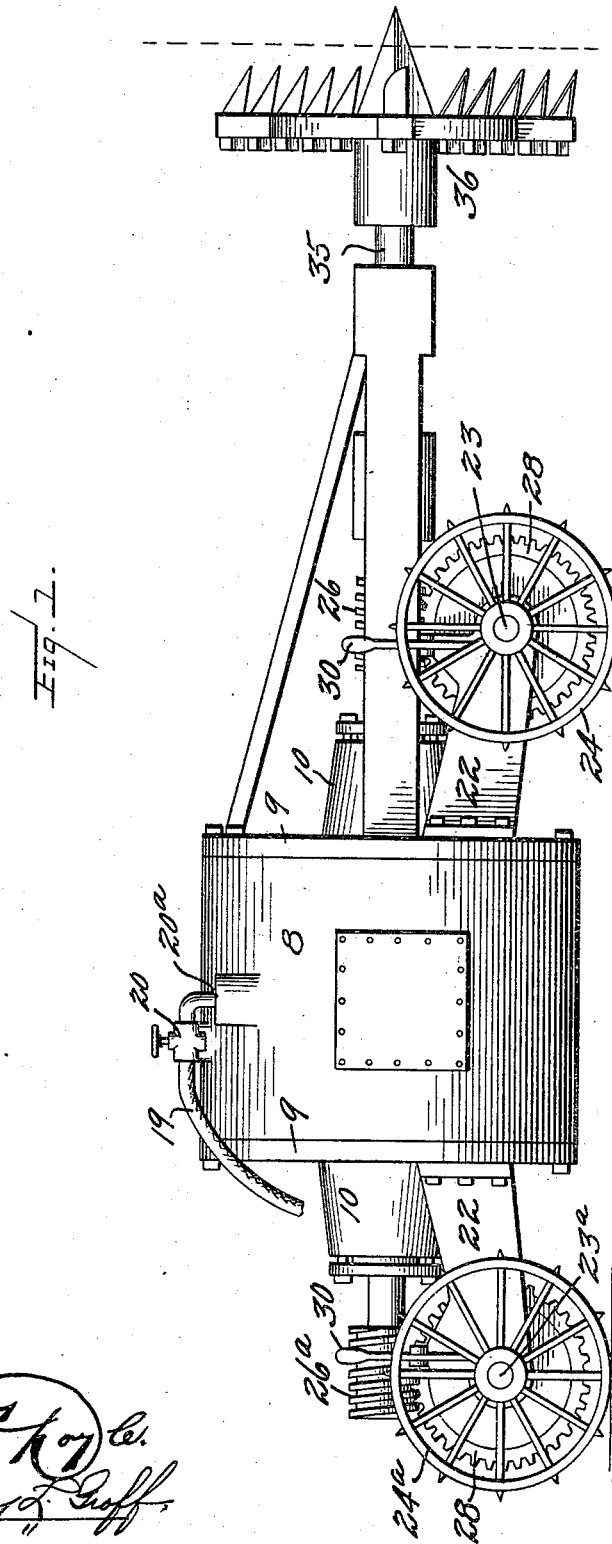

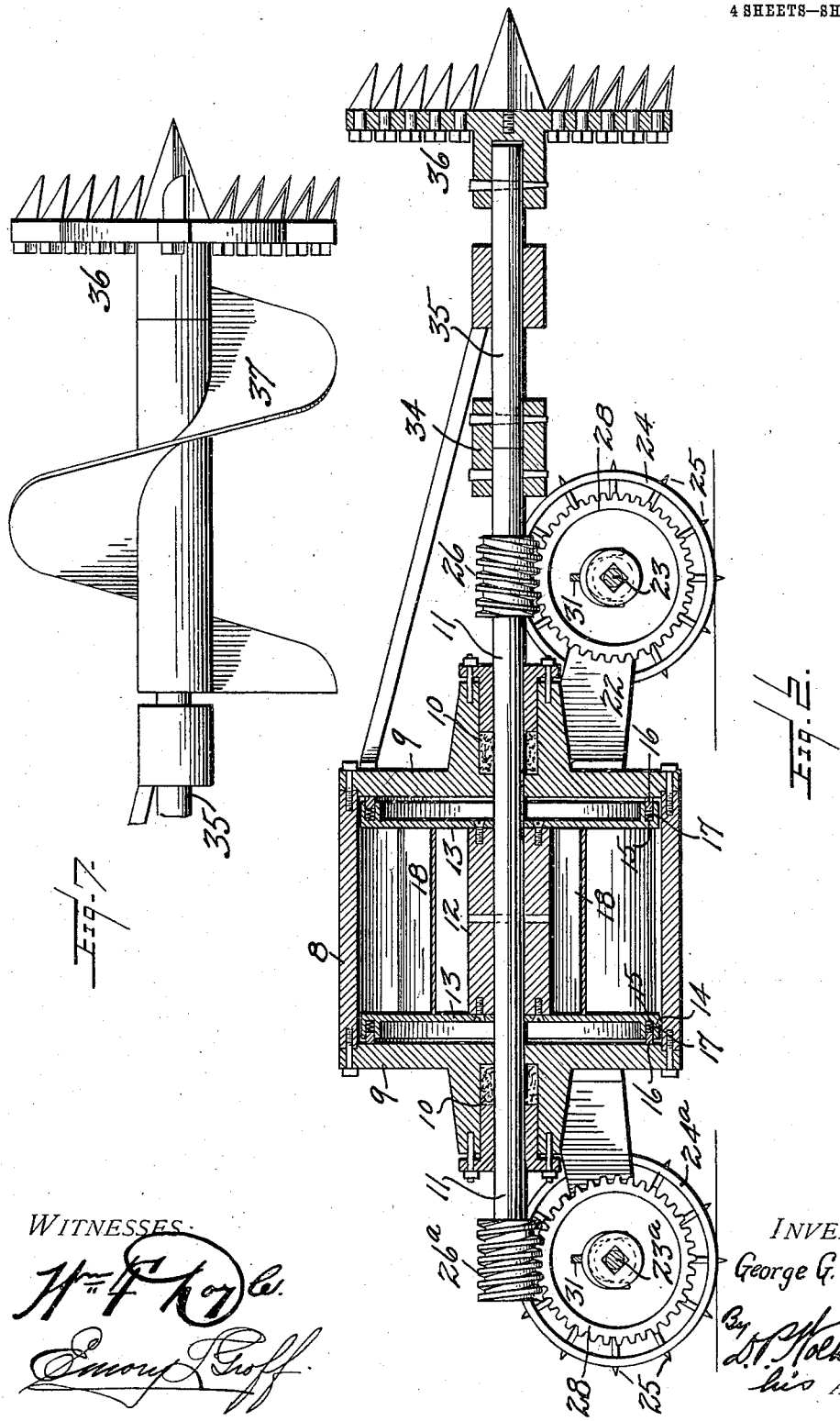

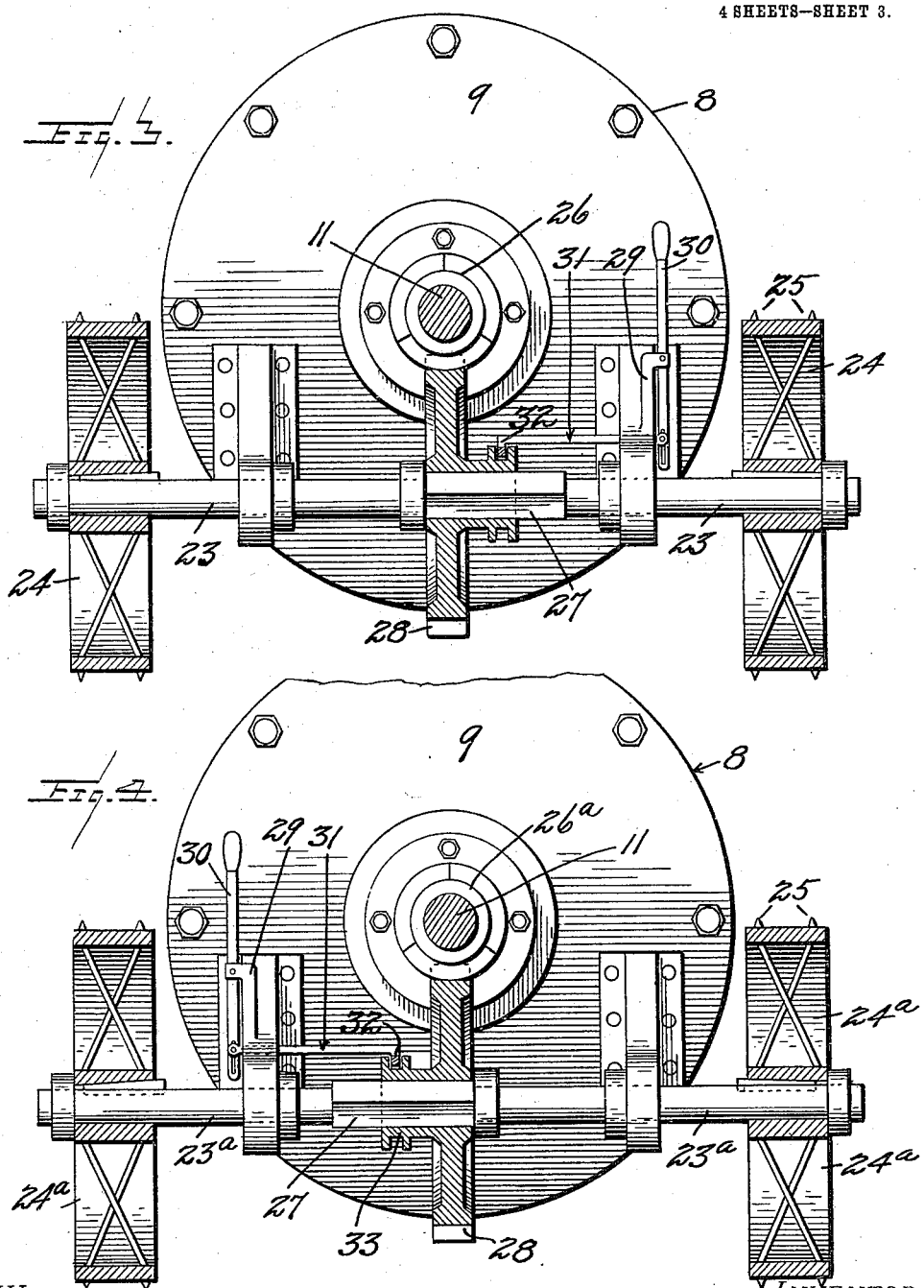

UNITED STATES PATENT OFFICE.

GEORGE G. BARKER, OF UPLAND, PENNSYLVANIA, ASSIGNOR OF ONE-HALF TO WILLIAM C. ALEXANDER, OF MEDIA, PENNSYLVANIA.

PORTABLE MINING-MACHINE.

966,378.  Specification of Letters Patent.  Patented Aug. 2, 1910.

Application filed July 21, 1909. Serial No. 508,845.

*To all whom it may concern:*

Be it known that I, GEORGE G. BARKER, a citizen of the United States, residing at Upland, in the county of Delaware and State of Pennsylvania, have invented certain new and useful Improvements in Portable Mining-Machines, of which the following is a specification.

The present invention relates more particularly to portable operating means for the cutting tool of mining mechanism, but it will be obvious that there are features which may be successfully employed for other purposes, so that the invention is not necessarily limited to mining operations.

The principal object is to provide a structure that is exceedingly simple, so that it can be produced at comparatively small cost, is very compact so that it is practical for employment in mines, and similar places where the space is limited, and is so arranged that it may be operated in either direction with facility.

The preferred embodiment of the invention is illustrated in the accompanying drawings, wherein:—

Figure 1 is a side elevation of the machine. Fig. 2 is a vertical longitudinal sectional view therethrough. Figs. 3 and 4 are respectively cross sectional views showing the mountings for the front and rear axles. Fig. 5 is a cross sectional view through the motor. Fig. 6 is a detail sectional view through the cutter. Fig. 7 illustrates a conveyer in connection with the cutter.

Similar reference numerals designate corresponding parts in all the figures of the drawings.

In the embodiment disclosed, the driving means is in the form of a rotary motor, comprising a cylindrical casing wall 8 having heads 9 secured thereon, said heads being provided with projecting stuffing boxes 10 of suitable character. A motor shaft 11 extends centrally through the casing and the stuffing boxes, and projects beyond both ends of said casing. Mounted on the shaft 11 within the casing is a piston member comprising a suitable hub 12 carrying spaced heads 13 that are provided with outstanding flanges 14 forming between them grooves 15. Packing rings 16, located in the grooves, operate against the inner faces of the casing heads 9, and are yieldingly held in such engagement by suitable springs 17. Blades or vanes 18 are exposed between the heads 13, and as shown particularly in Fig. 5, are arranged tangentially to the hub 12. Motive fluid for the motor may be of any suitable character, such as air under pressure, steam or gas, and is supplied from a suitable source through a pipe 19 having a throttle valve 20 thereon and delivering into the casing against the vanes through a nipple 20$^a$ formed upon one side of the casing. A suitable exhaust port 21 is provided in the opposite side of the casing.

The motor is supported on a frame that is in the form of brackets 22 secured to the heads 9 and having journaled in their free ends front and rear axles 23 and 23$^a$, to which are fastened front and rear ground or supporting wheels 24, 24$^a$ these wheels being preferably provided with spurs 25 to prevent their slipping. The motor shaft 11 directly over the axles is provided with opposite reversely set worms 26 and 26$^a$, and slidably mounted on angular portions 27 of said axles, are worm wheels 28 that are thus movable into and out of mesh with the worms 26. Any suitable means may be employed for moving and holding the worm wheels. Thus in the present embodiment, a bracket at each end of the motor is provided with a standard 29, on which is fulcrumed an actuating lever 30, and this lever has a link connection 31 with a depending yoke 32 engaging in an annular groove 33 formed in the hub of the worm wheel. By shifting either lever 30, the wheel connected thereto, can be thrown into and out of mesh with its coacting worm.

The front end of the motor shaft 11 has a coupling 34, to which is connected the stem 35 of a rotary cutting tool 36. Inasmuch as this cutting tool *per se* constitutes the subject-matter of a co-pending application, Serial No. 505,737, filed July 2, 1909, a specific description thereof is believed to be unnecessary. The shaft or stem 35 of the wheel may be provided with a suitable conveyer 37, in the form of a worm arranged in rear of the cutting tool, and designed to carry the cut material away from the opening produced by the tool.

Briefly described, the operation of the mechanism is substantially as follows. The motor being set in operation, one of the worm wheels is engaged with its worm 26$^a$, while the other is out of engagement, and the machine is thus fed forward to its work, the rotary cutter cutting away the material, as fast as the machine feeds. When a hole of the desired depth is secured, the driving gear for the worm 26ª is disengaged and the opposite gear engaged with the opposite worm 26, whereupon the machine will be withdrawn from the work.

It will be clear from the drawings and the above disclosure that the machine is exceedingly simple, a rotary motor being employed that does not have to be reversed, and all the driving mechanisms being associated directly with the motor shaft.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a machine of the character disclosed, the combination with a supporting frame, of a motor mounted thereon and having a projecting shaft, a tool holder carried by the shaft, supporting wheels for the frame, and means for connecting and disconnecting the shaft and wheels.

2. In a machine of the character disclosed, the combination with a supporting frame, of an axle journaled transversely thereon, ground wheels fixed to the axle, a motor mounted on the frame and having a projecting shaft disposed longitudinally of said frame, a tool holder connected to the shaft, and a driving worm gear between the shaft and axle.

3. In a machine of the character disclosed, the combination with a supporting frame, of front and rear ground wheels therefor, a motor mounted on the frame and having a shaft, a tool holder carried by said shaft and means for connecting the shaft to either set of wheels and respectively driving the same in opposite directions.

4. In a machine of the character disclosed, the combination with a supporting frame, of front and rear ground wheels therefor, a motor having a shaft projecting from both ends, a tool holder carried by said shaft and opposite reverse worm gearing for connecting the projecting ends of the shaft to the front and rear wheels respectively.

5. In a machine of the character disclosed, the combination with a supporting frame, of a motor mounted longitudinally thereon and having a shaft projecting from its ends, front and rear axles journaled on the frame at opposite ends of the motor and having ground wheels, a tool holder connected to the front end of the shaft, and means for detachably connecting the shaft with the axles for respectively rotating said axles in opposite directions.

6. In a machine of the character disclosed, the combination with a motor, of a supporting frame therefor including brackets secured to the ends of the motor, axles journaled on the brackets, a motor shaft projecting from both ends of the motor, a tool holder connected to one end of the shaft, oppositely disposed reversely set worms mounted on said shaft, worm wheels slidable on the axles and movable into and out of mesh with the worms, and means for moving said wheels.

In testimony whereof I hereunto affix my signature in the presence of two witnesses.

GEORGE G. BARKER.

Witnesses:
ANDREW A. CLARK,
ANNE RULON GRAY.